(12) United States Patent
Imagawa et al.

(10) Patent No.: US 6,657,666 B1
(45) Date of Patent: Dec. 2, 2003

(54) METHOD AND APPARATUS FOR RECORDING IMAGE INFORMATION

(75) Inventors: Seiji Imagawa, Yokohama (JP);
Hiroaki Ono, Fujisawa (JP);
Shigemitsu Higuchi, Fujisawa (JP);
Isao Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/332,446

(22) Filed: Jun. 14, 1999

(30) Foreign Application Priority Data

Jun. 22, 1998 (JP) .......................... 10-174522

(51) Int. Cl.$^7$ ............ H04N 5/76; H04N 7/00; H04N 5/222
(52) U.S. Cl. ............ 348/333.02; 348/231; 348/348; 348/116
(58) Field of Search ............... 348/333.01, 333.02, 348/333.12, 348, 231.3, 231.6, 116

(56) References Cited

U.S. PATENT DOCUMENTS

| | | | |
|---|---|---|---|
| 5,815,411 A | * | 9/1998 | Ellenby et al. ............. 364/559 |
| 6,195,122 B1 | * | 2/2001 | Vincent ............... 348/333.02 |
| 6,222,583 B1 | * | 4/2001 | Matsumura et al. ........ 348/113 |
| 2002/0052684 A1 | * | 5/2002 | Bide .................... 701/200 |

FOREIGN PATENT DOCUMENTS

| | | |
|---|---|---|
| JP | 9-37203 | 2/1997 |
| JP | 9-113981 | 5/1997 |
| JP | 9-135416 | 5/1997 |
| JP | 9-139906 | 5/1997 |
| JP | 9-200666 | 7/1997 |
| JP | 9-252454 | 9/1997 |

* cited by examiner

Primary Examiner—Wendy R. Garber
Assistant Examiner—Catherine J. Toppin
(74) Attorney, Agent, or Firm—Mattingly, Stanger & Malur, P.C.

(57) ABSTRACT

The purpose of the invention is to improve an operability of an image information recording and/or reproducing method and apparatus.

A shot place extraction means 6 is established so that the means 6 can extract a shot place proposed by referring a map information 5 corresponding to a shot position on the map, and furthermore a shot object extraction means 7 is establishes to that the means 7 can extract a shot object proposed by referring the map information 5 corresponding to the shot object on the map based on the shot position, a distance between the shot position and the shot object, and a direction from the shot position to the shot object.

10 Claims, 4 Drawing Sheets

METHOD AND APPARATUS FOR RECORDING IMAGE INFORMATION

BACKGROUND OF THE INVENTION

1. Field of the Invention

This invention is related to the method and the apparatus for recording and/or reproducing an image information, especially in which as recording and/or reproducing a shot image (that is the image shot by a person using an image-sensing device such as a camera) on/from a recording medium, a certain additional information corresponding to such as a shot place (that is the place in which the person has shot) and a shot object (that is the object for which the person has shot) can be recorded and/or reproduced with the shot image.

2. Description of the Related Art

In general an image information recording and/or reproducing apparatus, hereafter which is called as the image recording reproducing apparatus, includes some functions to record a shot image on a recording medium such as an optical film, a magnetic tape, an optical and/or magnetic disk and a semiconductor memory, to reproduce the recorded image on a display and to hard copy it as a photography.

It is well-known that the conventional image recording reproducing apparatus employing a timer has the functions to record a shot time (that is the time at which a person has shot) and to reproduce the shot time on a display with a shot image.

Also the functions to record an information of a shot position (that is the position on which a person has shot by standing) corresponding to a shot image, of which the information is obtained by calculating based on a radio wave information received from a plural number of satellites with GPS (Global Positioning System), and to reproduce the shot position information on a display with the shot image are known, for example, by the Japanese published unexamined patent application No. H9-113981.

Furthermore, the functions to record the information of a shot position and a shot direction (that is the direction to which the person has shot by making the camera turn) with a shot image, and to reproduce them on a display by making them link to a map data (that is the data as which is registered into the map) so that the moving locus of the shot position can be indicated are proposed by the Japanese published unexamined patent application No. H9-200666, and to reproduce the shot image mixed with a map image (that is the image as which is registered into the map) on a display so that a shot person (that is the person which has shot the shot image) can easily confirm the shot position are proposed by the Japanese published unexamined patent application No. H9-139906, respectively.

Moreover, in addition to detecting a shot position, the functions to obtain a position of a shot object by detecting a distance between the shot position and the shot object, for example, based on a focal distance (that is the distance which is measured by focusing a camera on the shot object) and to record and display the obtained information of the position of the shot object are proposed by the Japanese published unexamined patent application No. H9-135416.

Similarly, the functions to detect a shot position by using the GPS, to detect a shot direction by using a geomagnetism sensor and to detect a distance between the shot position and the shot object by using a focal distance, to specify concretely the shot place and/or the shot object, that is, for example to specify the location name or the proper name such as the North Alps or Mt. Fuji, and to record, reproduce and display them with the shot image are proposed by the Japanese published unexamined patent application No. H9-37203.

SUMMARY OF THE INVENTION

The conventional image recording reproducing apparatus described in the above-mentioned patent application No. H9-37203 has some advantages that when reproducing the shot image the shot place and the shot object can be easily confirmed and the works to discriminate, arrange and edit the reproduced shot image can be performed with no error and high efficiency since the shot position and/or the shot object are specified by the concrete location name and/or the proper name as which are memorized into the map information.

Especially, it is intelligible to record and display the shot position and the shot object, for example, with the name of a country, a prefecture and a cities, the proper name of a mountain and river, the specific name of a building and a park, or the location name of a place and an area.

However, by depending on the shot place such as a tourist-resort in which a plural number of famous objects are crowded, two or more famous buildings and facilities, or plural scenery of a mountain, a river and a lake may be shot in one scene of the shot image.

In the case, by using the method proposed by the patent application No. H9-37203, it will become difficult to specify only one from the plural shot objects.

It is, similarly, difficult to specify only one of the shot place.

It is convenient, in such case, if a certain information such as the proper name which indicates the shot place and the shot object can be selected, and the exact information regarding to said shot place and said shot object can be recorded and displayed according to the shot person's or the user's will.

The purpose of the invention is to enable to specify exactly the additional information concerning to the shot place and the shot object.

The purpose can be achieved by employing the following means:

shot place extractor to extract the shot place proposed by referring the map information corresponding to the shot position on the map, and, if two or more proposed shot places exist, to extract the shot places with higher order of the priority according to the degree of the exactness of the proposed shot places;

shot object extractor to extract the shot object proposed by referring the map information corresponding to the shot object on the map and by referring the shot position, the distance between the shot position and the shot object, and the direction of the shot object, and, if two or more proposed shot objects exist, to extract the shot objects with higher order of the priority according to the degree of the exactness of the proposed shot objects;

display to display the proposed shot places and the proposed shot objects with the priority on a display;

selection means to select at least one of the displayed proposed shot places and the displayed proposed shot objects.

By using these means of the invention, the shot person or the user can specify the information of the shot place and the shot object added on the shot image exactly according to his will.

In this case it is desirable that the shot place extractor sets up the fixed area, for example circle area, around of the shot position on the map, extracts the proposed shot place corresponding to at least one of the plural objects, places and areas which may correspond to the shot place within the fixed area, and then sets up said priority with the order according to the distance from the center of the fixed area, that is with nearer order from the center.

Similarly, it is desirable that the shot object extractor sets up the fixed area, for example ellipsoid area, around of the shot object with a long extension to the shot direction on the map, extracts the proposed shot object corresponding to at least one of the plural objects, places and areas which may correspond to the shot object within the fixed area, and then sets up said priority with the order according to the distance either from the center of the fixed area or from the axis of the shot direction, that is with nearer order from the center or the axis.

It is also desirable that the extension of the fixed area set up to extract the shot place and the shot object has a default value, and also the value can be made change by the shot person and the user.

In addition, the map information is supplemented with the information of the weight according to the predetermined degree of notability and of shot-frequency for at least one of the specific objects, places and areas so that the shot object extractor can set up the order of the priority according to the weight, and the information of the shot object to be added to the shot image can become more exact.

And if there is no proposed shot object in the fixed area, the fixed area should be extended to extract the proper shot object with repetition.

Moreover, by supplying some external instructions, the objects, places and areas according to the proposed shot object and the proposed shot place can be extracted as at least one of the character information on the map, for example the proper name such as Mt. Fuji, and the location information, for example the prefecture name such as Shizuoka, and the extracted information can be displayed and recorded with the shot image.

When reproducing the recorded information, by supplying some external instructions of selection, it is also able to select and display at least one of the character information and the location information.

It is desirable that the location information can be displayed by the method of marking it on the map.

By recording the extracted or selected information of the shot place and the shot object in compliance with the shot image on a medium, as reproducing the exact information of the shot place and the shot object can be reproduced on a display with the shot image.

To improve the operability, it is desirable that the instruction means to instruct recording of the information of the shot place and the shot object by synchronizing with recording of the shot image or the character information on the medium can be used.

When reproducing, it is also desirable that an index information for the shot image can be displayed according to an instruction.

In this case, the normal display and the index display can be alternated by the instruction.

And it is possible to input an instruction to instruct whether to display the information of the shot place and the shot object or not so that the procedure for extracting the shot place and the shot object, and for recording, reproducing and displaying them can be controlled.

Moreover, it is desirable to have a pause function by which the recording of the information of the shot object can be paused if it is not in agreement with the actual name, for example, of the background.

While the shot image cannot be recorded, or such information as the proper names of the extracted shot place and the shot object can not be recorded, they can be displayed so that the information regarding to the current shot place and the circumference geography can be obtained in compliance with the map, and they can be helpful as a convenient guide for a stranger of the location.

DETAILED DESCRIPTION OF THE PREFERRED EMBODIMENTS

As follows, one of embodiments of the invention is explained with their drawings.

In the drawings, 1, 2, 3, 4, 5, 6, 7, 8 and 9 denote an image information input device, a position detector, a distance detector, a direction detector, a memory, a shot place extractor, a shot object extractor, a recorder/reproducing device and a display, respectively.

Figure 1:
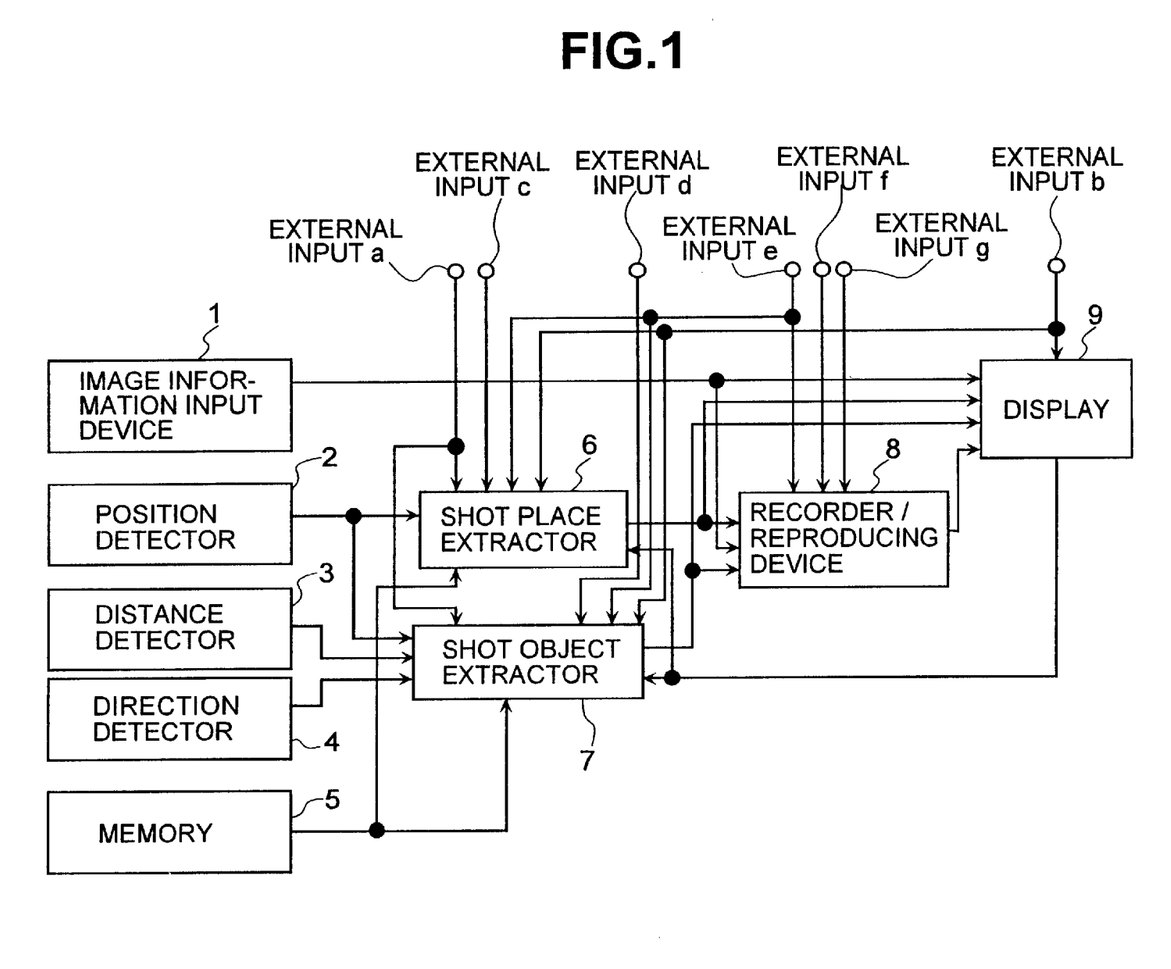
FIG. 1 is a block diagram representation which shows one embodiment of an image information recording reproducing apparatus of the present invention.

FIG. 1 shows the block diagram representation of the main part of the embodiment of the image information recording reproducing apparatus of the present invention.

In FIG. 1, the image information input device 1 denotes a shot apparatus (that is an image-sensing device such as a video-camera and a still-camera), in which mechanical, optical and electrical parts such as a shutter, a focus, a lens, signal processing LSIs, a memory and a optical film etc. are included to shoot an object such as a person, a building and a scenery and to convert the shot object to an image information data.

The shot image information data are supplied to the recorder/reproducing device 8 and to the display 9.

The position detector 2 detects the standing position of the image information input device 1, that is the shot position.

Although not illustrated, it has GPS antenna to receive the radio wave information from GPS satellites, and has an operation device by which the shot position can be calculated and detected based on the received information.

The information of the detected shot position is supplied to the shot place extractor 6 and to the shot object extractor 7.

The distance detector 3 detects the distance between the shot position and the shot object, and the focal length concerning to the shot object can be detected as the distance from the shot position and to the shot object while the auto-focusing of the image information input device 1.

Or else, the distance measurement apparatus using a laser etc. can be employed for the detection.

The detected distance information is supplied to the shot object extractor 7.

The direction detector 4 detects the direction from the image information input device 1 to the shot object, specifically in which a geomagnetism sensor and a gyroscope etc. can be used.

The detected direction information is supplied to the shot object extractor 7.

The memory 5 is the memory means to save a map information.

For example a semiconductor memory, a disk apparatus and a tape apparatus etc. can be employed for the memory means.

In the map information, at least, in addition to a general information concerning to the map, the information mentioned later are included.

The shot place extractor 6 extracts the shot position as the specified object, place or area based on the shot position detected by the position detector 2 and the map information saved in the memory 5.

The map position information concerning to the extracted shot place is supplied to the recorder/reproducing device 8 and to the display 9.

That is, the proposed shot place on the map can be extracted in compliance with the shot position, and if a plural number of proposed shot places exist, then it can be detected with a priority given to the higher order of the correctness of the proposed shot places.

At least one of the extracted proposed shot places is supplied to the recorder/reproducing device 8 and to the display 9.

The shot object extractor 7 extracts the shot object as the specified object, place or area based on the shot position detected by the position detector 2, the information of the distance from the shot position to the shot object detected by the distance detector 3, the information of the direction from the shot position to the shot object detected by the direction detector 4 and the map information saved in the memory 5.

The map position information concerning to the extracted shot object is supplied to the recorder/reproducing device 8 and to the display 9.

That is, the proposed shot object on the map can be extracted in compliance with the shot object by using the shot position, the distance to the shot object and the direction to the shot object based on the map information, and if a plural number of proposed shot objects exist, then it can be detected with a priority given in the higher order of the correctness of the proposed shot objects.

At least one of the extracted proposed shot objects is supplied to the recorder/reproducing device 8 and to the display 9.

The recorder/reproducing device 8 includes a recording medium on which the map position information outputted from the shot place extractor 6 and the shot object extractor 7 are recorded with the shot image information data supplied from the image information input device 1.

The image information data and the map position information recorded on the medium can be also reproduced.

For the recorder/reproducing device 8, specifically, a semiconductor memory, a disk recording reproducing apparatus and a tape recording reproducing apparatus etc. can be used.

The display 9 can display the map position information outputted from the shot place extractor 6 and the shot object extractor 7 with the image information shot by the image information input device 1.

The reproduced image information data and the reproduced map position information outputted from the recorder/reproducing device 8 can be also displayed.

For the display 9, specifically, a liquid-crystal display and a cathode-ray-tube display etc. can be used.

The details about the feature part of the embodiment constituted as mentioned above are explained with their operations.

In determining the shot place based on the map information and the shot position detected by GPS, and in determining the shot object based on the detected shot position, the information of the distance and the direction to the shot object and the map information, it is noticed that the mistaken map position information can be extracted and displayed if the place such as an inside of the town in which the map position information are gathered closely together can be proposed, or else if the detection error becomes larger because of the long distance between the shot position and the shot object.

In order to solve this problem the shot place extractor 6 sets up the fixed area, for example circle area, around of the shot position of which the information is detected by the position detector 2.

In the fixed area, objects, places or areas which may be the shot place can be proposed and each of them can be set up with the order of the priority.

The setting for the order of the priority can proceed based on the distance from the center of the fixed area, for example of the circle area.

The map position information for the shot places proposed with the higher priority can be outputted to the recorder/reproducing device 8 and to the display 9.

By the way, in the map position information of the shot place set up as mentioned above, it is expected that an inappropriate information may be clearly contained from the view point of the shot person's knowledge.

In order to improve the usability, in the embodiment of the invention, if the shot person recognizes that the displayed map position information is not correct, the information can be corrected by using the external input signal b.

That is, the external input signal b is inputted into the shot place extractor 6, and the shot place extractor 6 triggered by the external input signal b supplies the map position information to the display 9, of which the proposed shot place set up the priority can be shown as the concerning character information or with the marking on the map.

Thereby, the inputted proposed shot place can be displayed with the priority given in the higher order by the display 9.

And, from the proposed shot places on the panel of the display 9 the shot person can choose the proposed one suitable for his will.

The display 9 supplies the chosen result information to the shot place extractor 6.

Thereby, the exact map position information chosen by the shot person's will from the extracted proposed shot places is specified as the shot place, and it is outputted from the shot place extractor 6 to the recorder/reproducing device 8 and recorded in compliance with the shot image.

While the shot person does not choose one of the proposed shot places, by outputting all of the extracted proposed shot places to and by recording them in the recorder/ reproducing device 8 it can be allowed that the person determines the shot place as reproducing or editing.

Similarly, it is also made the shot object extractor 7 to extract the proposed shot objects, to attach the priority for them, to display them on the display 9, and to specify the proposed shot object chosen by the shot person as the map position information for the shot object.

However, as compared with the direction information, many errors are included in the distance information as the distance between the shot position and the shot object becomes long since the shot object extractor 7 deduces the position of the shot object from the distance information and the direction information based on the shot position.

Therefore, the shot object extractor 7 sets up the large area in the shot direction such as the ellipsoid area).

Figure 2:
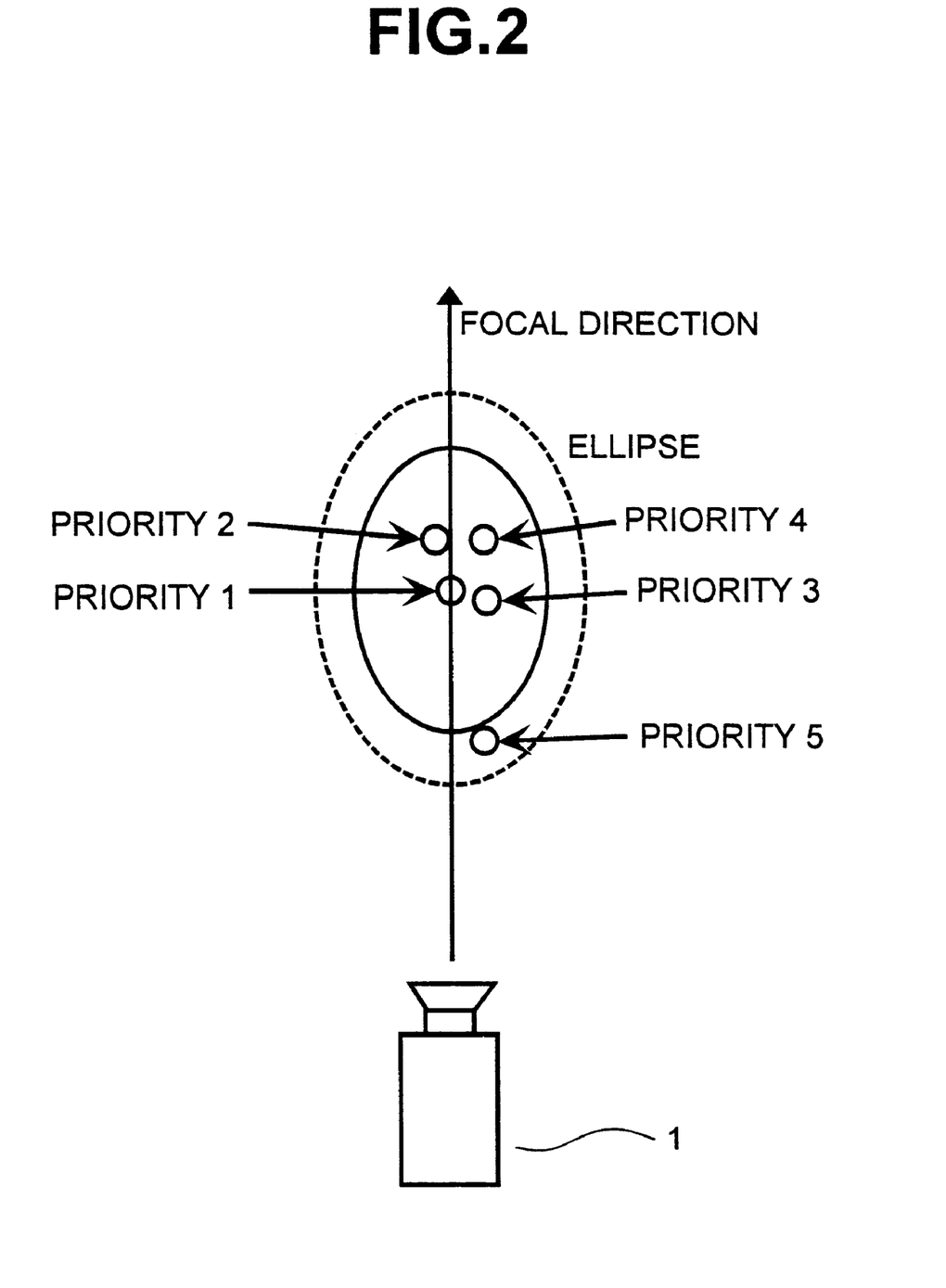
FIG. 2 denotes one embodiment indicating a procedure of the invention by which a shot object can be extracted.

As shown in FIG. 2, for example, the ellipsoid area shown as a solid line which has the long axis in the direction from the shot position 1 to the shot object, that is the focal direction, is set up.

The compression rate of the ellipsoid is set up in consideration of the distance from the shot position to the shot object.

And, within the set ellipsoid area, objects, places or areas which may be the shot object can be proposed and each of them can be set up with the order of the priority.

For setting of the priority 1 to 4, it is desirable that the distance from the long axis of the ellipsoid area can be taken into consideration in addition to the distance from the center of the area.

Moreover, if there is no proposed shot object within the first set up ellipsoid area shown as the solid line, the area can be extended to set up the new area shown as a dotted line so that the proposed shot object can be detected and the priority can be newly set up.

The functions of the external input signals a to g which are introduced by taking the operability of the recording reproducing apparatus shown as the above-mentioned embodiment into consideration are explained as follows.

Figure 3:
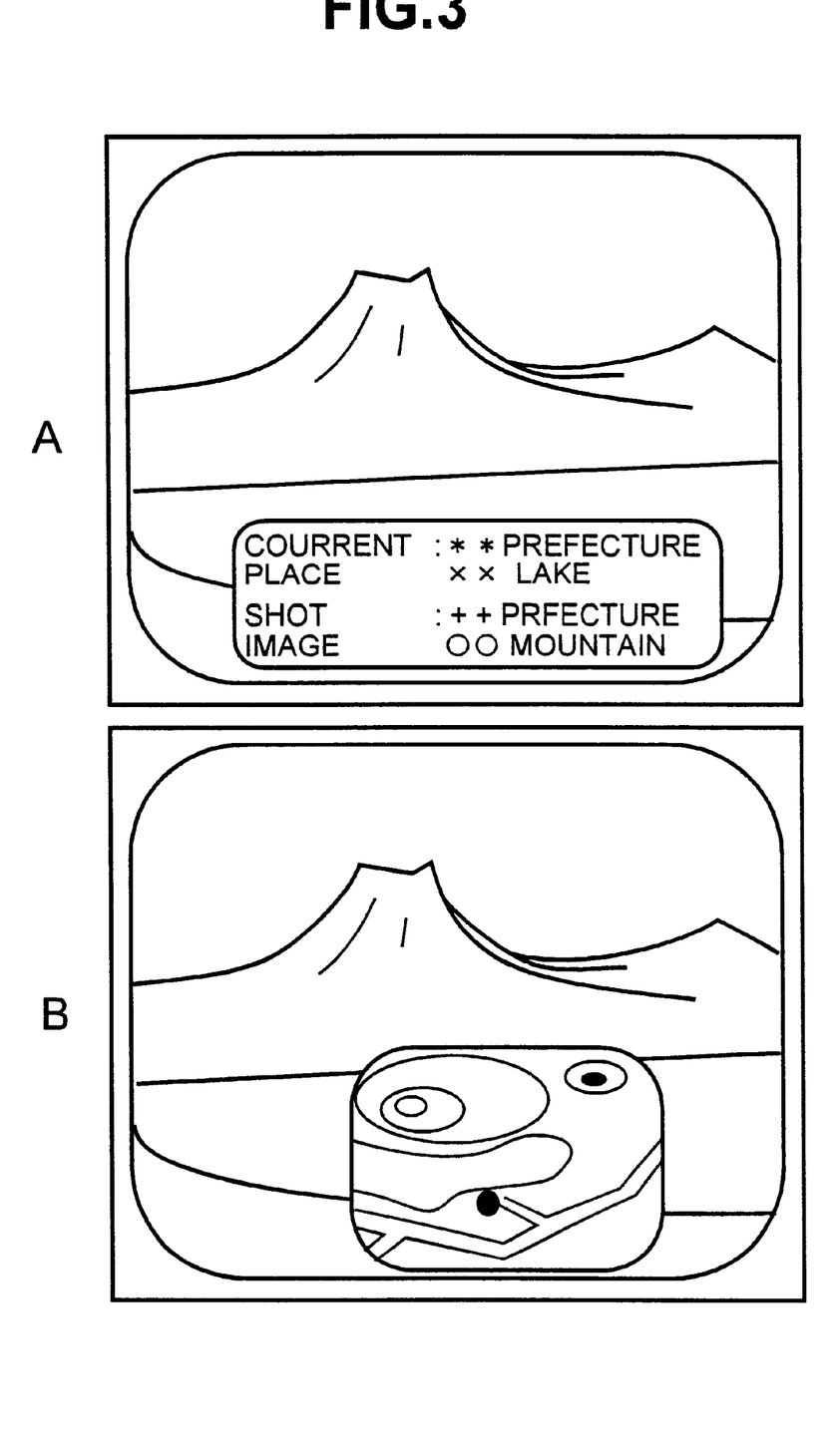
FIG. 3 denotes one embodiment of contents of map position information displayed with the shot image.

As shown in FIGS. 3 A and B, the external input signal a denotes the signal by which the display of the contents of the map position information can be changed.

The external input signal a is inputted into the shot place extractor 6 and the shot object extractor 7, and each of the means performs the output corresponding to the external input signal a.

FIG. 3A shows an example as which the map position information is displayed by the character information such as the current place is near XX lake in ** prefecture, and the shot image is ○○ mountain in ++ prefecture.

And FIG. 3B shows an example as which the map position information is displayed by the marking of ● on the map.

As mentioned above, the external input signal b is used for correcting the map position information of the shot place or the shot object deduced by the shot place extractor 6 or the shot object extractor 7 respectively.

The external input signal c is used in the shot place extractor 6 as the command signal which performs ON, OFF and PAUSE functions for displaying and recording the map position information.

If the OFF command signal is inputted, the shot place extractor 6 does not perform the processing for the extraction of the map position information so that the information can not be supplied to the display 9 and to the recorder/reproducing device 8.

If the PAUSE command signal is inputted, the shot place extractor 6 does not perform the processing for the correction of the map position information so that the same information can be continuously supplied to them.

The external input signal d is used in the shot object extractor 7 as the command signal which performs ON, OFF and PAUSE functions for displaying and recording the map position information of the shot object.

If the OFF command signal is inputted, the shot object extractor 7 does not perform the processing for the extraction of the map position information of the shot object so that the information can not be supplied to the display 9 and to the recorder/reproducing device 8.

If the PAUSE command signal is inputted, the shot object extractor 7 does not perform the processing for the correction of the map position information of the shot object under outputting so that the same information can be continuously supplied to them.

Thereby, especially when the shot person shoots a person as the shot object, if he shoots it after he set up at once the map position information of the background of the shot object and he fixed the setting by using the PAUSE command, then it enables to display and record the map position information of the background as that of the shot object, thus the usability can be improved.

The external input signal e denotes the command signal which sets up whether the image information data shot by the image information input device 1 can be recorded or not, and the signal is inputted into the shot place extractor 6, the shot object extractor 7 and the recorder/reproducing device 8.

If the recording of the image information data is set up by the command, the map position information extracted by the shot place extractor 6 and the shot object extractor 7 can be outputted to the recorder/reproducing device 8.

And, the recorder/reproducing device 8 records the map position information of the shot place and the shot object outputted from the shot place extractor 6 and the shot object extractor 7 respectively with the image information data supplied from the image information input device 1.

Moreover, the index information which consists of a part of the image information data and the map position information of the shot place and the shot object is recorded on a specific portion of the recording medium.

Figure 4:
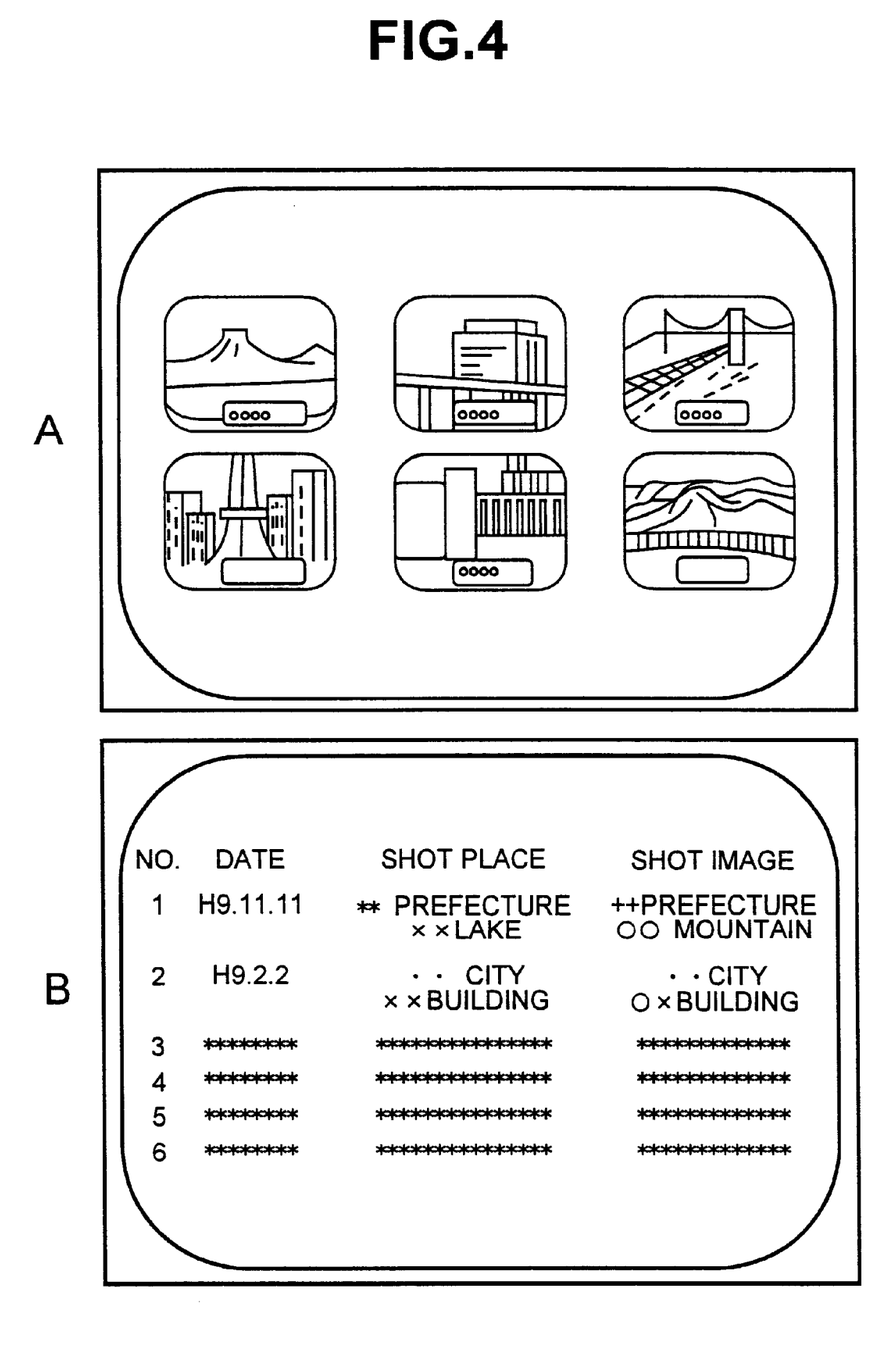
FIG. 4 denotes one embodiment of contents of index information displayed on a different scene from the shot image.

An example of the index information is shown in FIGS. 4A and B.

In addition, if the recording of the image information data is not set up by the command, the only performance for displaying can be processed by the display 9.

The external input signal f denotes the command signal by which the regular reproduction which means reproducing for the recorded image information and the irregular reproduction which means reproducing for the index information can be changed.

In the regular reproduction, as shown in FIG. 3, the image information and the map position information can be displayed.

The external input signal g denotes the command signal for changing the method of displaying the index information.

In the irregular reproduction, that is, by using this command signal, the plural images with each small size and the character information corresponding to them with an arrangement can be changed on the display as shown in FIG. 4A and FIG. 4B respectively.

In addition, the above-mentioned external input device which includes the command signals of a to g is used for the user's interface specifically which means the shot person's operation or the user's operation of the buttons installed on the main part of the apparatus or on the remote control device reserved for the apparatus.

As explained above, in the embodiments of the invention, it is convenient since the shot person or the user can choose the map position information of the shot place and the shot object such as the proper names with a correctness, and can record, reproduce and/or display them according to his will.

Consequently, the effectiveness by which the information added to the shot image for the shot place and the shot object can be exactly specified is brought.

By the way, although an example of the recording reproducing apparatus for moving image such as the 8 mm video and the DVC (Digital Video Cassette) is explained in the above-mentioned embodiments, this invention is not restricted to it.

The invention is applicable to the optical film camera and the digital still camera for still image so that the same effects can be obtained.

Moreover, although an example as which the priority for the proposed shot place and the proposed shot object is determined according to the distance from the center of the circle area or the ellipsoid area is shown in the above-mentioned embodiments, this invention is not restricted to it.

In the invention, for the objects, places and areas which constitute the map information as components, the weight which makes a measure the degree of notable or the frequency of detection can be set up and can be saved in the memory 5 so that the much more exact extraction can be performed by setting up the priority according to the setup weight or corresponding to the product of the weight and the distance from the center.

Based on this invention, as mentioned above, as recording and/or reproducing the shot image, the shot person or the user can know the map information corresponding to the positions or the proper names etc. of the shot place, the shot object and the background of them without his consciousness, and therefore the operability can be improved since the information supplemented to the shot image can be specified with a correctness.

What is claimed is:

1. An apparatus for recording image information comprising:
   (a) position detection means for detecting a shot position of said image information recording apparatus;
   (b) reading means for reading out an information of a map from a memory medium;
   (c) shot place extraction means for extracting a shot place proposed by referring said map information corresponding to said shot position on said map, and if two or more proposed shot places exist, then for extracting with a higher order of priority according to a degree of exactness of said proposed shot places;
   (d) distance detection means for detecting a distance between said shot position and a shot object;
   (e) direction detection means for detecting a direction from said shot position to said shot object;
   (f) shot object extraction means for extracting a shot object proposed by referring said map information corresponding to said shot object on said map based on said detected shot position, said detected distance, and said detected direction, and if two or more proposed shot objects exist, then for extracting with a higher order of priority according to a degree of exactness of said proposed shot objects;
   (g) recording means for recording at least one of said extracted proposed shot places and at least one of said extracted proposed shot objects in compliance with a shot image; and
   displaying means for displaying one of said proposed shot places with a highest priority extracted by said shot place extraction means and one of said proposed shot objects with a highest priority from said shot object extraction means is included; and
   selecting means for selecting at least one of said displayed proposed shot place and said displayed proposed shot object.

2. An apparatus for recording image information comprising:
   (a) position detection means for detecting a shot position of said image information recording apparatus;
   (b) reading means for reading out an information of a map from a memory medium;
   (c) shot place extraction means for extracting a shot place proposed by referring said map information corresponding to said shot position on said map, and if two or more proposed shot places exist, then for extracting with a higher order of priority according to a degree of exactness of said proposed shot places;
   (d) distance detection means for detecting a distance between said shot position and a shot object;
   (e) direction detection means for detecting a direction from said shot position to said shot object;
   (f) shot object extraction means for extracting a shot object proposed by referring said map information corresponding to said shot object on said map based on said detected shot position, said detected distance, and said detected direction, and if two or more proposed shot objects exist, then for extracting with a higher order of priority according to a degree of exactness of said proposed shot objects; and
   (g) recording means for recording at least one of said extracted proposed shot places and at least one of said extracted proposed shot objects in compliance with a shot image,
   wherein said shot place extraction means sets up a fixed area around said shot position on said map, extracts said proposed shot place corresponding to at least one of objects, places and areas which may correspond to said shot place within said fixed area, and then sets up said priority based on a distance from a center of said fixed area.

3. An apparatus for recording image information comprising:
   (a) position detection means for detecting a shot position of said image information recording apparatus;
   (b) reading means for reading out an information of a map from a memory medium;
   (c) shot place extraction means for extracting a shot place proposed by referring said map information corresponding to said shot position on said map, and if two or more proposed shot places exist, then for extracting with a higher order of priority according to a degree of exactness of said proposed shot places;
   (d) distance detection means for detecting a distance between said shot position and a shot object;

(e) direction detection means for detecting a direction from said shot position to said shot object;

(f) shot object extraction means for extracting a shot object proposed by referring said map information corresponding to said shot object on said map based on said detected shot position, said detected distance, and said detected direction, and if two or more proposed shot objects exist, then for extracting with a higher order of priority according to a degree of exactness of said proposed shot objects; and (g) recording means for recording at least one of said extracted proposed shot places and at least one of said extracted proposed shot objects in compliance with a shot image;

wherein said shot object extraction means sets up a fixed area around said shot object on said map, extracts said proposed shot object corresponding to at least one of objects, places and areas which may correspond to said shot object within said fixed area, and then sets up said priority based on a distance from a center of said fixed area.

4. The apparatus of claim 3, wherein said fixed area is set up by extending said fixed area to be a wider area in said shot direction from said center than in a perpendicular direction to said shot direction.

5. The apparatus of claim 2, wherein said fixed area is extended to extract a proper shot object with repetition if there is no proposed shot object in said area.

6. A method for recording image information, comprising the steps of:

(a) detecting a shot position on which a person shoots said image information by standing;

(b) reading out an information of a map from a memory medium;

(c) extracting a shot place proposed by referring said map information corresponding to said shot position on said map, and if two or more proposed shot places exist, then extracting with a higher order of priority according to a degree of exactness of said proposed shot places;

(d) detecting a distance between said shot position and a shot object;

(e) detecting a direction from said shot position to said shot object;

(f) extracting a shot object proposed by referring said map information corresponding to said shot object on said map based on said detected shot position, said detected distance and said detected direction, and if two or more proposed shot objects exist, then extracting with a higher order of priority according to a degree of exactness of said proposed shot objects; and (g) recording at least one of said extracted proposed shot places and at least one of said extracted proposed shot objects in compliance with a shot image;

wherein one of said proposed shot places and one of said proposed shot objects respectively with a highest priority are displayed, and selecting at least one of said displayed proposed shot place and said displayed proposed shot object.

7. A method for recording image information, comprising the steps of:

(a) detecting a shot position on which a person shoots said image information by standing;

(b) reading out an information of a map from a memory medium;

(c) extracting a shot place proposed by referring said map information corresponding to said shot position on said map, and if two or more proposed shot places exist, then extracting with a higher order of priority according to a degree of exactness of said proposed shot places;

(d) detecting a distance between said shot position and a shot object;

(e) detecting a direction from said shot position to said shot object;

(f) extracting a shot object proposed by referring said map information corresponding to said shot object on said map based on said detected shot position, said detected distance and said detected direction, and if two or more proposed shot objects exist, then extracting with a higher order of priority according to a degree of exactness of said proposed shot objects; and (g) recording at least one of said extracted proposed shot places and at least one of said extracted proposed shot objects in compliance with a shot image;

wherein a fixed area around said shot object on said map is set up, said proposed shot object corresponding to at least one of objects, places and areas which may correspond to said shot object within said fixed area is extracted, and then said priority is set up based on a distance from a center of said fixed area.

8. A method for recording image information, comprising the steps of:

(a) detecting a shot position on which a person shoots said image information by standing;

(b) reading out an information of a map from a memory medium;

(c) extracting a shot place proposed by referring said map information corresponding to said shot position on said map, and if two or more proposed shot places exist, then extracting with a higher order of priority according to a degree of exactness of said proposed shot places;

(d) detecting a distance between said shot position and a shot object;

(e) detecting a direction from said shot position to said shot object;

(f) extracting a shot object proposed by referring said map information corresponding to said shot object on said map based on said detected shot position, said detected distance and said detected direction, and if two or more proposed shot objects exist, then extracting with a higher order of priority according to a degree of exactness of said proposed shot objects; and (g) recording at least one of said extracted proposed shot places and at least one of said extracted proposed shot objects in compliance with a shot image, wherein a fixed area around shot object on said map is set up, said proposed shot object corresponding to at least one of objects, places and areas which may correspond to said shot object within said fixed area is extracted, and then said priority is set up based on a distance from a center of said fixed area.

9. The method of claim 8, wherein said fixed area is set up by extending said fixed area to be a wider area in said shot direction from said center than in a perpendicular direction to said shot direction.

10. The method of claim 7, wherein said fixed area is extended to extract a proper shot object with repetition if there is no proposed shot object in said area.

* * * * *